(12) United States Patent
Hata

(10) Patent No.: US 7,050,446 B2
(45) Date of Patent: May 23, 2006

(54) COMMUNICATION CONTROL DEVICE AND METHOD

(75) Inventor: Hajime Hata, Tokyo (JP)

(73) Assignee: Sony Corporation, Tokyo (JP)

( * ) Notice: Subject to any disclaimer, the term of this patent is extended or adjusted under 35 U.S.C. 154(b) by 824 days.

(21) Appl. No.: 09/794,973

(22) Filed: Feb. 27, 2001

(65) Prior Publication Data

US 2001/0017860 A1 Aug. 30, 2001

(30) Foreign Application Priority Data

Feb. 29, 2000 (JP) .......................... P2000-054281

(51) Int. Cl.
*H04L 12/28* (2006.01)
*H04L 12/56* (2006.01)

(52) U.S. Cl. .................. 370/412; 370/413; 370/415; 370/389

(58) Field of Classification Search ................ 370/412, 370/395, 396, 397, 398, 400, 419, 422, 428, 370/352, 353, 354, 355, 356, 357, 358, 359, 370/360, 404, 389, 392, 471, 486, 487, 503, 370/429, 413–417, 402, 489, 447, 362, 465, 370/468, 490, 496, 502, 461; 710/107, 113, 710/4, 29, 45, 62, 24, 10, 26, 37, 5, 22, 241, 710/23, 33, 7, 8, 31, 46, 110; 709/104, 220, 709/222, 226, 225; 711/156

See application file for complete search history.

(56) References Cited

U.S. PATENT DOCUMENTS

| | | | | |
|---|---|---|---|---|
| 4,958,341 A * | 9/1990 | Hemmady et al. ........... 370/352 |
| 5,363,497 A * | 11/1994 | Baker et al. ................. 711/153 |
| 5,517,626 A * | 5/1996 | Archer et al. ............... 710/110 |
| 5,701,502 A * | 12/1997 | Baker et al. ................. 709/201 |
| 5,860,119 A * | 1/1999 | Dockser ...................... 711/156 |
| 5,948,080 A * | 9/1999 | Baker .......................... 710/37 |
| 5,983,301 A * | 11/1999 | Baker et al. ................. 710/113 |
| 5,991,304 A * | 11/1999 | Abramson ................... 370/413 |
| 5,996,032 A * | 11/1999 | Baker .......................... 710/62 |
| 6,006,286 A * | 12/1999 | Baker et al. .................. 710/22 |
| 6,081,852 A * | 6/2000 | Baker .......................... 710/24 |
| 6,333,938 B1* | 12/2001 | Baker .......................... 370/503 |
| 6,438,102 B1* | 8/2002 | Chui et al. ................... 370/229 |
| 6,463,485 B1* | 10/2002 | Chui et al. ................... 710/52 |
| 6,519,268 B1* | 2/2003 | Smyers ........................ 370/536 |
| 6,611,886 B1* | 8/2003 | Lee et al. ..................... 710/45 |
| 6,775,020 B1* | 8/2004 | Fukunaga et al. .......... 358/1.15 |
| 2001/0012383 A1* | 8/2001 | Kawai ......................... 382/114 |

* cited by examiner

*Primary Examiner*—Wellington Chin
*Assistant Examiner*—Jamal A. Fox
(74) *Attorney, Agent, or Firm*—Frommer Lawrence & Haug LLP; William S. Frommer; Thomas F. Presson

(57) ABSTRACT

A communication control device includes a determination circuit for determining whether reception of an asynchronous packet from an IEEE 1394 serial bus is allowed or denied by comparing the sum of the size of the asynchronous packet to be received and the size of packets currently stored in a receive FIFO unit with the size of packets which can be stored in the receive FIFO unit. The communication control device further includes an acknowledge generating circuit for generating an acknowledge signal asserting whether reception of the asynchronous packet is allowed or denied based on the determination result of the determination circuit, and the generated acknowledge signal is sent back to the IEEE 1394 serial bus.

10 Claims, 2 Drawing Sheets

COMMUNICATION CONTROL DEVICE AND METHOD

BACKGROUND OF THE INVENTION

1. Field of the Invention

The present invention generally relates to communication control devices, and more particularly to a communication control device which receives an asynchronous packet from an IEEE 1394 serial bus, and stores the received asynchronous packet in a receive FIFO unit, in which an acknowledge signal asserting whether reception of an asynchronous packet is allowed or denied in response to the asynchronous packets stored in the receive FIFO unit is sent back to the IEEE 1394 serial bus, and to a communication control method.

2. Description of the Related Art

A typical communication control device is illustrated in FIG. 2. An IEEE 1394 link core 1 includes an asynchronous packet receiving circuit 2 for receiving asynchronous packets from an IEEE 1394 serial bus, and an acknowledge generating circuit 3.

The asynchronous packets received by the asynchronous packet receiving circuit 2 are passed to a receive FIFO (First-In First-Out) unit 4 through an ON/OFF switch 6, and are then stored therein. The ON/OFF switch 6 serves as a controller for controlling whether or not the asynchronous packets received by the asynchronous packet receiving circuit 2 are stored in the receive FIFO unit 4. The asynchronous packets read from the receive FIFO unit 4 are transferred to a microcomputer 7 for signal processing using software running on the microcomputer 7.

The switch 6 is turned on/off in response to a control signal from a determination circuit 5, as described below. A gate circuit may be provided in place of the switch 6. Alternatively, in response to a control signal from the determination circuit 5, the receive FIFO unit 4 may be directly controlled as to whether or not the asynchronous packets received by the asynchronous packet receiving circuit 2 are stored in the receive FIFO unit 4. In the latter case, the receive FIFO unit 4 also serves as a controller.

The determination circuit 5 determines whether reception of asynchronous packets that are to be received by the asynchronous packet receiving circuit 2 is allowed or not. Here, the size of an asynchronous packet which is to be received by the asynchronous packet receiving circuit 2 is designated as $P_{in}$, the size of asynchronous packets currently stored in the receive FIFO unit 4 is designated as $P_{now}$, and the maximum size of packets which can be stored in the receive FIFO unit 4 is designated as $P_{max}$.

Based on the $P_{in}$ data from the asynchronous packet receiving circuit 2, and the $P_{now}$ data and $P_{max}$ data from the receive FIFO unit 4, the determination circuit 5 determines that reception of the new asynchronous packet by the asynchronous packet receiving circuit 2 is denied when $P_{max} < P_{now} + P_{in}$. In this case, the determination circuit 5 also allows the switch 6 to be turned off. When $P_{max} \geq P_{now} + P_{in}$, however, the determination circuit 5 determines that reception of the new asynchronous packet by the asynchronous packet receiving circuit 2 is allowed. In this case, the determination circuit 5 also allows the switch 6 to be turned on. These determination results are forwarded to the acknowledge generating circuit 3.

Upon a receipt of a flag indicating the determination result of the determination circuit 5, the acknowledge generating circuit 3 generates acknowledge (b) indicating whether reception of the new asynchronous packet (a) is allowed or denied, and sends the acknowledge (b) back to the IEEE 1394 serial bus. Acknowledge (b) includes "acknowledge complete (or acknowledge pending)" when the flag indicates a high logic (H) output, and "acknowledge busy" when the flag indicates a low logic (L) output.

Since the foregoing communication control device provides a fixed maximum size of packets which can be stored in the receive FIFO unit 4, some problems occur when the asynchronous packet read from the receive FIFO unit 4 is passed to the microcomputer 7 for signal processing using software running on the microcomputer 7.

If the microcomputer 7 has a low throughput relative to the maximum size of packets which can be stored in the receive FIFO unit 4, or when the microcomputer 7 maintains a lower throughput only for a certain period, the receive FIFO unit 4 has the capacity enough to store the received asynchronous packet. Accordingly, the acknowledge generating circuit 3 would generate "acknowledge complete" or "acknowledge pending" representing that reception of a new asynchronous packet is allowed, but not generate "acknowledge busy" representing that reception of a new asynchronous packet is denied.

Since the throughput of the microcomputer 7 for the asynchronous packet is low, a period of more than 100 ms is required for a sequence of procedures in which the microcomputer 7 starts processing the asynchronous packet, terminates once, again starts processing the asynchronous packet when storage is allowed in the receive FIFO unit 4, and terminates. Because the period of more than 100 ms is outside that specified by a split-transaction protocol, a protocol error occurs, possibly leading to a connection problem.

On the other hand, if the microcomputer 7 has a high throughput relative to the maximum size of packets which can be stored in the receive FIFO unit 4, or when the microcomputer 7 maintains a higher throughput only for a certain period, asynchronous packets in excess of the maximum packet-storage size would not be stored, and such a high throughput of the microcomputer 7 for the asynchronous packets is not fully utilized.

As used herein, the period during which the microcomputer 7 maintains a higher (lower) throughput means the period during which the processing of the microcomputer 7 is influenced (is not influenced) by any other software.

Accordingly, a communication control device may receive an asynchronous packet from an IEEE 1394 serial bus, store the received asynchronous packet in a FIFO unit 4, and thereafter generate an acknowledge signal asserting whether reception of an asynchronous packet is allowed or denied. An apparatus incorporating such a communication control device is associated with a problem when a microcomputer contained therein does not provide balance between the throughput and the maximum size of asynchronous packets which can be stored in the FIFO unit 4 of the communication control device, the problem being that a protocol error possibly occurs or the throughput of the microcomputer for asynchronous packets may not be sufficiently utilized.

SUMMARY OF THE INVENTION

In view of the foregoing problems, an object of the present invention is to provide a communication control device which receives an asynchronous packet from an IEEE 1394 serial bus and stores the received asynchronous packet in a receive FIFO unit, in which an acknowledge signal asserting whether reception of an asynchronous packet is allowed or denied in response to the asynchronous packets stored in the receive FIFO unit is sent back to the IEEE 1394 serial bus, and the storage capacity of the receive FIFO unit is balanced by the throughput of a processor for processing the asynchronous packets read from the receive FIFO unit. Another object of the present invention is to provide a communication control method for use with the communication control device.

To this end, the present invention provides a communication control device including an asynchronous packet receiving circuit for receiving an asynchronous packet from a communication bus, and a receive FIFO unit for receiving and storing the asynchronous packet received by the asynchronous packet receiving circuit. The communication control device further includes a controller for controlling whether or not the asynchronous packet received by the asynchronous packet receiving circuit is to be stored in the receive FIFO unit, a storage size setting circuit for setting a packet-storage size in the receive FIFO unit, and a determination circuit for determining whether reception of an asynchronous packet that is to be received by the asynchronous packet receiving circuit is allowed or denied by comparing the sum of the size of the asynchronous packet to be received and the size of packets currently stored in the receive FIFO unit with the size set by the storage size setting circuit. The communication control device further includes an acknowledge generating circuit for generating an acknowledge signal asserting whether reception of the asynchronous packet, which is to be received, is allowed or denied based on the determination result of the determination circuit, wherein the acknowledge signal generated by the acknowledge generating circuit is sent back to the communication bus.

The storage size setting circuit may output static set storage size data or dynamic set storage size data.

Preferably, the communication bus is a serial bus, and the serial bus is an IEEE 1394 serial bus.

In another aspect of the present invention, a communication control method is provided for a communication control device including an asynchronous packet receiving circuit for receiving an asynchronous packet from a communication bus, and a receive FIFO unit for receiving and storing the asynchronous packet received by the asynchronous packet receiving circuit. The communication control method includes the steps of controlling whether or not the asynchronous packet received by the asynchronous packet receiving means is to be stored in the receive FIFO unit, setting a packet-storage size in the receive FIFO unit, determining whether reception of the asynchronous packet, which is to be received by the asynchronous packet receiving means, is allowed or denied by comparing the sum of the size of the asynchronous packet to be received and the size of packets currently stored in the receive FIFO unit with the set storage size, and generating an acknowledge signal asserting whether reception of the asynchronous packet, which is to be received, is allowed or denied based on the determination result obtained in the determining step, wherein the generated acknowledge signal is sent back to the communication bus.

Therefore, there is no risk that a certain temporal constraint of a split-transaction protocol will be violated, thus eliminating the possibility of protocol errors, and problem that the throughput of the microcomputer for asynchronous packets may not be fully utilized does not occur.

According to the present invention, the storage size set by the storage size setting circuit may be automatically changed depending upon the load on the processor for processing the asynchronous packets read from the receive FIFO unit, and depending upon the throughput or performance.

Furthermore, the storage size set by the storage size setting circuit may be changed depending upon the load on the processor for processing the asynchronous packets read from the receive FIFO unit and upon various environmental changes including stability on the IEEE 1394 serial bus based on the history of the number of retries. Therefore, the throughput of asynchronous transactions can be controlled accordingly.

DESCRIPTION OF THE PREFERRED EMBODIMENTS

Figure 1:
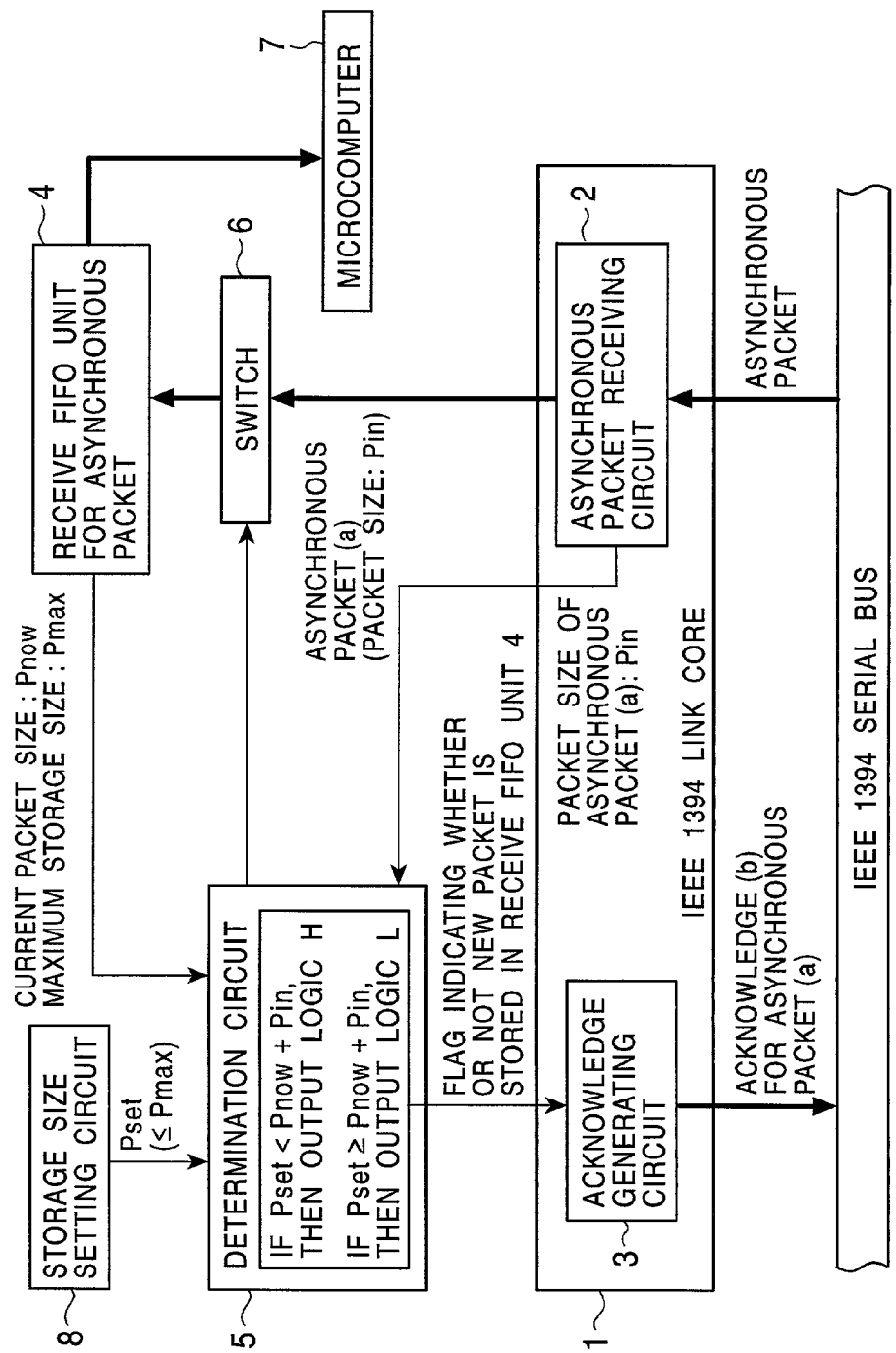
FIG. 1 is a block diagram of a communication control device according to an embodiment of the present invention.
Figure 2:
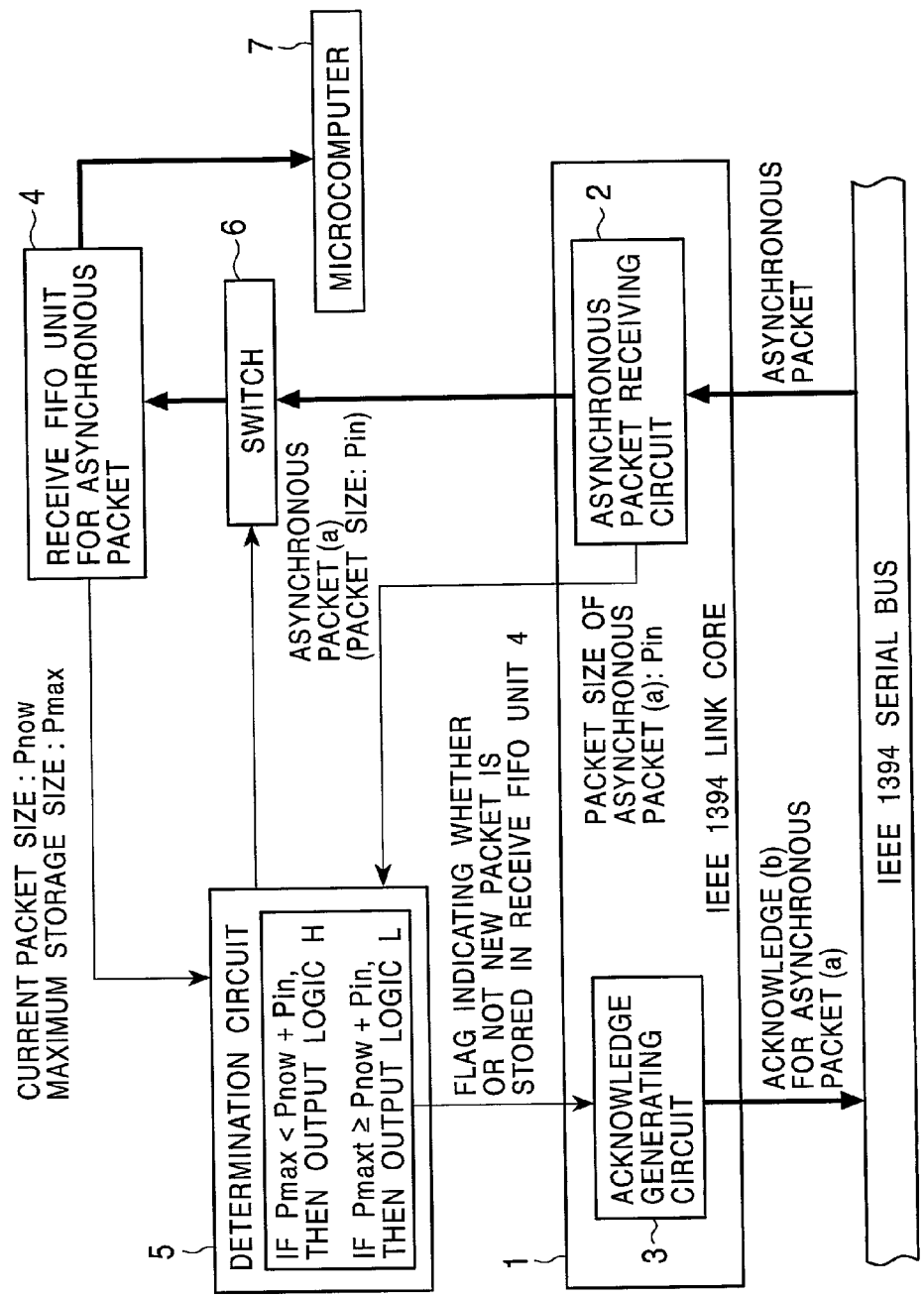
FIG. 2 is a block diagram of a typical communication control device.

FIG. 1 shows a communication control device according to an embodiment of present invention. All the components in the communication control device except an IEEE 1394 serial bus and a microcomputer 7 external to the communication control device may be formed of a semiconductor integrated circuit. In FIG. 1, the same reference numerals are assigned to the components corresponding to those of FIG. 2.

An IEEE 1394 link core 1 includes an asynchronous packet receiving circuit 2 for receiving an asynchronous packet from an IEEE 1394 serial bus, and an acknowledge generating circuit 3.

The asynchronous packet received by the asynchronous packet receiving circuit 2 is passed to a receive FIFO (First-In First Out) unit 4 through an ON/OFF switch 6, and is then stored therein. The ON/OFF switch 6 serves as a controller for controlling whether or not the asynchronous packet received by the asynchronous packet receiving circuit 2 is stored in the receive FIFO unit 4. The asynchronous packets read from the receive FIFO unit 4 are transferred to the microcomputer 7 for signal processing using software running on the microcomputer 7. The switch 6 is turned on/off in response to a control signal from a determination circuit 5, as described below.

A storage size setting circuit 8 for setting the size of packets which can be stored in the receive FIFO unit 4 generates set storage size $P_{set}$ data, and the data is passed to the determination circuit 5, as described below.

The determination circuit 5 determines whether reception of an asynchronous packet that is to be received by the asynchronous packet receiving circuit 2 is allowed or denied. Here, the size of an asynchronous packet which is to be received by the asynchronous packet receiving circuit 2 is designated as $P_{in}$, the size of asynchronous packets currently stored in the receive FIFO unit 4 is designated as $P_{now}$, and the maximum size of packets which can be stored in the receive FIFO unit 4 is designated as $P_{max}$.

Based on the $P_{in}$ data from the asynchronous packet receiving circuit 2, the $P_{now}$ data and $P_{max}$ data from the receive FIFO unit 4, and the $P_{set}$ data from the storage size setting circuit 8, where $0 \leq P_{set} \leq P_{max}$, the determination circuit 5 determines that reception of the new asynchronous packet by the asynchronous packet receiving circuit 2 is denied when $P_{set} < P_{now} + P_{in}$. In this case, the determination circuit 5 also allows the switch 6 to be turned off. When $P_{set} \geq P_{now} + P_{in}$, however, the determination circuit 5 determines that reception of the new asynchronous packet by the asynchronous packet receiving circuit 2 is allowed. In this case, the determination circuit 5 also allows the switch 6 to be turned on. These determination results are forwarded to the acknowledge generating circuit 3.

Upon a receipt of a flag indicating the determination result of the determination circuit 5, the acknowledge generating circuit 3 generates acknowledge (b) indicating whether reception of the new asynchronous packet (a) is allowed or denied, and sends the acknowledge (b) back to the IEEE 1394 serial bus. Acknowledge (b) includes "acknowledge complete (or acknowledge pending)" when the flag indicates a logic H output representing that reception of the new asynchronous packet (a) by the asynchronous packet receiving circuit 2 is denied, and "acknowledge busy" when the flag indicates a logic L output representing that reception of the new asynchronous packet (a) by the asynchronous packet receiving circuit 2 is allowed.

The storage size setting circuit 8 may be a circuit for outputting static set storage size $P_{set}$ data such as data concerning a manually set storage size. Otherwise, the storage size setting circuit may be a circuit for outputting dynamic set storage size $P_{set}$ data according to the load on the microcomputer 7 which processes the asynchronous packets read from the receive FIFO unit 4.

Since the storage size $P_{set}$ set by the storage size setting circuit 8 may vary in a range of $0 \geq P_{set} \geq P_{max}$, a communication control device incorporating the receive FIFO unit 4 is capable of apparently varying the maximum capacity. The maximum capacity may apparently vary depending upon the size, throughput, etc. of an apparatus incorporating the microcomputer 7 and the communication control device, and thus the communication control device may be versatile.

While the present invention has been described through illustration of its preferred form, it is to be understood that the described embodiment is only illustrative and various changes and modifications may be imparted thereto without departing from the scope of the present invention which is limited solely by the appended claims.

What is claimed is:

1. A communication control device including asynchronous packet receiving means for receiving an asynchronous packet from a communication means, and a receive FIFO unit for receiving and storing the asynchronous packet received by said asynchronous packet receiving means, said communication control device comprising:

control means for controlling whether the asynchronous packet received by said asynchronous packet receiving means is to be stored in the receive FIFO unit;

storage size setting means for setting a packet-storage size in the receive FIFO unit based on load data representative of a load on a processing device and environmental data representative of a throughput, a performance, a stability, and a history of retries of the communication means;

determination means for determining whether reception of an asynchronous packet that is to be received by said asynchronous packet receiving means is allowed or denied by comparing a sum of the size of the asynchronous packet to be received and a size of packets currently stored in the receive FIFO unit with a size set by said storage size setting means, wherein the determination means is operatively connected to the control means and is adapted to provide operational signals to the control means related to an operational state of the control means, and wherein a determination result is made up of the result of said comparison in the determination means and a result of provided operational signals from the determination means to the control means; and acknowledge generating means for generating an acknowledge signal indicating whether reception of the asynchronous packet, which is to be received, is allowed or denied based on the determination result of said determination means, wherein the acknowledge signal generated by said acknowledge generating means is transmitted to the communication means.

2. A communication control device according to claim 1, wherein said storage size setting means includes means for outputting static set storage size data.

3. A communication control device according to claim 1, wherein said storage size setting means includes means for outputting dynamic set storage size data.

4. A communication control device according to claim 1, wherein the communication means is a serial bus.

5. A communication control device according to claim 4, wherein the serial bus is an IEEE 1394 serial bus.

6. A communication control method for a communication control device including asynchronous packet receiving means for receiving an asynchronous packet from a communication means, and a receive FIFO unit for receiving and storing the asynchronous packet received by the asynchronous packet receiving means, said communication control method comprising:

controlling whether the asynchronous packet received by the asynchronous packet receiving means is to be stored in the receive FIFO unit;

setting a packet-storage size in the receive FIFO unit based on load data representative of a load on a processing device and environmental data representative of a throughput, a performance, a stability, and a history of retries of the communication means;

determining whether reception of an asynchronous packet that is to be received by the asynchronous packet receiving means is allowed or denied by comparing a sum of the size of the asynchronous packet to be received and a size of packets currently stored in the receive FIFO unit with a set storage size;

providing operational signals to the control step for modifying an operational state of a switching device, utilized in the controlling step, as a function of the determining step;

forwarding a result of said determining step and said step of providing operational signals to control step to an acknowledge generating means; and generating an acknowledge signal indicating whether reception of the asynchronous packet, which is to be received, is allowed or denied based on the determination result obtained in the determining step, wherein the generated acknowledge signal is transmitted to the communication means.

7. A communication control method according to claim 6, wherein said step of setting the size includes outputting static set storage size data.

8. A communication control method according to claim 6, wherein said step of setting the size includes outputting dynamic set storage size data.

9. A communication control method according to claim 6, wherein the communication means is a serial bus.

10. A communication control method according to claim 9, wherein the serial bus is an IEEE 1394 serial bus.

* * * * *